US008345551B2

(12) United States Patent
Wakuda et al.

(10) Patent No.: US 8,345,551 B2
(45) Date of Patent: Jan. 1, 2013

(54) TRANSMISSION RATE CONTROL METHOD AND COMMUNICATION DEVICE

(75) Inventors: Kensaku Wakuda, Kanagawa (JP); Tomoya Oikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 12/835,168

(22) Filed: Jul. 13, 2010

(65) Prior Publication Data
US 2011/0026401 A1    Feb. 3, 2011

(30) Foreign Application Priority Data

Jul. 29, 2009    (JP) .................................. 2009-176689

(51) Int. Cl.
*G01R 31/08*    (2006.01)
*G06F 15/16*    (2006.01)
*H04B 7/00*    (2006.01)
(52) U.S. Cl. ......... 370/232; 370/229; 370/310; 709/238
(58) Field of Classification Search ................... 370/229, 370/230, 232, 235, 237, 310; 709/230, 238
See application file for complete search history.

(56) References Cited

U.S. PATENT DOCUMENTS

| 7,706,260 | B2 * | 4/2010 | Cohen et al. | 370/229 |
|---|---|---|---|---|
| 8,014,290 | B2 * | 9/2011 | Ji | 370/237 |
| 2007/0025242 | A1 * | 2/2007 | Tsang | 370/229 |
| 2008/0239948 | A1 * | 10/2008 | Bai et al. | 370/230 |
| 2010/0118114 | A1 * | 5/2010 | Hosseini et al. | 348/14.09 |

OTHER PUBLICATIONS

Guang Yang, et al., "Adaptive Video Streaming in Presence of Wireless Errors", Proc of the IPIF/IEEE MMNS Conference, Springer Verlag, San Diego, California, 2004, pp. 26-38.

* cited by examiner

*Primary Examiner* — Ricky Ngo
*Assistant Examiner* — Paul H Masur
(74) *Attorney, Agent, or Firm* — Oblon, Spivak, McClelland, Maier & Neustadt, L.L.P.

(57) ABSTRACT

There is provided a transmission rate control method. In this method, data is transmitted to a receiver at the most recent transmission rate $R_{SND}^{t-1}$, and an RTCP packet including a reception rate $R_{RCV}^{t}$ of the data is received from the receiver. When a network is in a congestion state, or when the network is in a non-congestion state and the most recent reception achievement rate $R_{AR}^{t-1}$ is higher than the reception rate $R_{RCV}^{t}$, a reception achievement rate $R_{AR}^{t}$ is calculated as a long-term EWMA of the reception rate $R_{RCV}$. When the network is in the non-congestion state and the most recent reception achievement rate $R_{AR}^{t-1}$ is lower than the reception rate $R_{RCV}^{t}$, or when a time-out of the RTCP packet occurs, the reception achievement rate $R_{AR}^{t}$ is calculated as a short-term EWMA of the reception rate $R_{RCV}$. A transmission rate $R_{SND}^{t}$ is set based on the reception achievement rate $R_{AR}^{t}$.

6 Claims, 6 Drawing Sheets

TRANSMISSION RATE CONTROL METHOD AND COMMUNICATION DEVICE

The present application contains subject matter related to that disclosed in Japanese Priority Patent Application JP 2009-176689 filed in the Japan Patent Office on Jul. 29, 2009, the entire content of which is hereby incorporated by reference.

BACKGROUND OF THE INVENTION

1. Field of the Invention

The present invention relates to a transmission rate control method and a communication device.

2. Description of the Related Art

In a packet-switched streaming delivery system, video data and audio data are downloaded from a server side to a client side to be buffered, and thereafter to be reproduced, whereby almost real-time streaming delivery is realized. However, in a system such as a video conferencing system emphasizing real-time performance, in order to avoid reproduction delay due to buffering, a transmission rate is regulated on the server side in accordance with network conditions to prevent a packet loss.

When end-to-end communication is performed on a packet-switched network, TCP (Transport Control Protocol) is utilized for the purpose of controlling a delivery rate in a transport layer. However, in the TCP, a variation of the delivery rate is large, and automatic retransmission is performed semi-indefinitely; therefore, the TCP is not suitable for the real-time streaming delivery.

Thus, in the real-time streaming delivery, UDP (User Datagram Protocol) is mainly utilized. The UDP uses a rate control method such as TFRC (TCP Friendly Rate Control), RAP (Rate Adaptive Protocol), and DVRC (Dynamic Video Rate Control).

However, the above rate control methods are based on AIMD (additive-increase and multiplicative-decrease) as in the TCP. Thus, in networks including a wireless environment, a rate variation is increased in accordance with a variation in the network band, and there is an issue that a packet loss easily occurs due to a rapid rate increase. The packet loss is causative of the omission of frames of video, the disturbance of video, and the interruption in sound, leading to significant reduction in communication quality.

Meanwhile, as a rate control method with a small rate variation, there has been known VTP (Video Transport Protocol) described in "Adaptive video streaming in presence of wireless errors" (G. Yang, M. Gerla, and M. Y. Sanadidi, Proc of the IPIF/IEEE MMNS Conference, Springer Verlag, San Diego, Calif., 2004).

SUMMARY OF THE INVENTION

However, in the VTP, the followability to a rapid rate reduction is low, and therefore there is an issue that the packet loss easily occurs. Thus, there has been desired a rate control method that based on the VTP with a small rate variation, a delivery delay and the packet loss can be suppressed even in networks including a wireless environment.

Thus, the present invention provides a transmission rate control method and a communication device, which can suppress the delivery delay and the packet loss in the streaming delivery on networks including a wireless environment.

According to an embodiment of the present invention, there is provided a transmission rate control method including the steps of: in a streaming delivery on networks including a wireless environment, transmitting data to a reception device at the most recent transmission rate $R_{SND}^{t-1}$ and receiving an RTCP packet including a reception rate $R_{RCV}^{t}$ of the data from the reception device; when the network is in a congestion state, or when the network is in a non-congestion state and the most recent reception achievement rate $R_{AR}^{t-1}$ is higher than the reception rate $R_{RCV}^{t}$, calculating a reception achievement rate $R_{AR}^{t}$ as a long-term EWMA (exponential weighted moving average) of the reception rate $R_{RCV}$, and when the network is in the non-congestion state and the most recent reception achievement rate $R_{AR}^{t-1}$ is lower than the reception rate $R_{RCV}^{t}$, or when a time-out of the RTCP packet occurs, calculating the reception achievement rate $R_{AR}^{t}$ as a short-term EWMA of the reception rate $R_{RCV}$; and setting a transmission rate $R_{SND}^{t}$ based on the reception achievement rate $R_{AR}^{t}$.

According to the transmission rate control method, the transmission rate is set based on the reception achievement rate that is calculated as the long-term EWMA or short-term EWMA of the reception rate in accordance with network conditions. According to this configuration, in the streaming delivery on networks including a wireless environment, the followability of the transmission rate with respect to the network conditions is enhanced, and the delivery delay and the packet loss can be suppressed.

Here, in the step of calculating the reception achievement rate $R_{AR}^{t}$, the reception achievement rate $R_{AR}^{t}$ may be calculated as the long-term EWMA or the short-term EWMA of the reception rate $R_{RCV}$ represented by the following formula:

when the reception achievement rate $R_{AR}^{t}$ is calculated as the long-term EWMA of the reception rate $R_{RCV}$, $$R_{AR}^{t} \leftarrow \alpha_L \cdot R_{AR}^{t-1} + (1-\alpha_L) \cdot R_{RCV}^{t}, \text{ and}$$

when the reception achievement rate $R_{AR}^{t}$ is calculated as the short-term EWMA of the reception rate $R_{RCV}$, $$R_{AR}^{t} \leftarrow \alpha_S \cdot R_{AR}^{t-1} (1-\alpha_S) \cdot R_{RCV}^{t},$$

wherein $0 < \alpha_S < \alpha_L < 1$.

Here, in the step of setting the transmission rate $R_{SND}^{t}$, the transmission rate $R_{SND}^{t}$ may be set by the following formulae:

when the network is in the non-congestion state, $$R_{SND}^{t} \leftarrow (R_{RCV}^{t} \cdot RTT^{t} + 1)/(RTT^{t} + \Delta RTT)$$

$$R_{SND}^{t} \leftarrow \beta \cdot R_{SND}^{t} + (1-\beta) \cdot R_{AR}^{t}, \text{ and}$$

further, when $R_{SND}^{t} >$ a limit rate $R_{LR}^{t}$, $R_{SND}^{t} \leftarrow R_{LR}^{t}$; and when the network is in the congestion state, $$R_{SND}^{t} \leftarrow R_{AR}^{t},$$

further, when $R_{SND}^{t} > R_{RCV}^{t}$, $R_{SND}^{t} \leftarrow R_{RCV}^{t}$, $$R_{SND}^{t''} \leftarrow (R_{RCV}^{t} \cdot RTT^{t} + 1)/(RTT^{t} + \Delta RTT), \text{ and}$$

further, when $R_{SND}^{t''} < R_{SND}^{t}$, $R_{SND}^{t} \leftarrow (R_{SND}^{t''} + R_{SND}^{t})/2$, wherein $RTT^{t}$ and $RTT^{t-1}$ are the latest RTT and the most recent RTT, $\Delta RTT$ is a variation of the RTT ($RTT^{t} - RTT^{t-1}$), $R_{LR}^{t}$ is the limit rate defining an upper limit of $R_{SND}^{t}$, $R_{SND}^{t''}$ is a temporary transmission rate, $0 < \beta < 1$, and $0 < \gamma < 1$.

Here, the limit rate $R_{LR}^{t}$ may be calculated by the following formula:

when $R_{SND}^{t-1} < R_{MAX}$, $$R_{LR}^{t} \leftarrow R_{SND}^{t-1} + \alpha_{LR} \cdot (R_{MAX} - R_{SND}^{t-1}) + \Delta R_{MIN}, \text{ and}$$

when $R_{SND}^{t-1} \leq R_{MAX}$, $$R_{LR}^{t} \leftarrow R_{SND}^{t-1} + \Delta R_{MIN},$$

wherein $R_{SND}^{t-1}$ is the most recent transmission rate, $R_{MAX}$ is the maximum transmission rate in the current communication connection, $\Delta R_{MIN}$ is the minimum increase limit rate (a constant, $\Delta R_{MIN} \geq 0$), and $0 < \alpha_{LR} < 1$.

Further, when $RTT^t$ is changed from a state of not more than $RTT_{START}$ to a state of more than $RTT_{START}$, or when a packet loss occurs, it is determined that the network is transferred to the congestion state, and when $RTT^t$ is changed from a state of not less than $RTT_{END}$ to a state of less than $RTT_{END}$, and when $SRTT^t/LRTT^t < \alpha$, it is determined that the network is transferred to the non-congestion state, and the transmission rate control method may further include a step of, even when it is determined that the network is transferred to the non-congestion state, regarding that the congestion state of the network is continued for a congestion state duration $\Delta_\tau$, represented by the following formula, from the point of time when the network transfers to the congestion state:

$$\Delta_\tau \leftarrow \mu \cdot (RTT_{MIN} - RTT_{MIN})/(2) \cdot (1-\gamma)),$$

wherein $RTT^t$ is the latest RTT, $RTT_{START}$ and $RTT_{END}$ are RTT upon the transfer of the network to the congestion state defined by a Spike method and RTT upon the transfer of the network to the non-congestion state defined by the Spike method, $SRTT^t$ and $LRTT^t$ are the short-term EWMA and the long-term EWMA of the RTT, $\alpha > 1$, $0 < \gamma < 1$, and $\mu < 1$.

According to another embodiment of the present invention, there is provided a communication device including: a communication processing unit which, in a streaming delivery on networks including a wireless environment, transmits data to a reception device at the most recent transmission rate $R_{SNip}^{t-1}$ and receives an RTCP packet including a reception rate $R_{RCV}^t$ of the data from the reception device; a reception achievement rate calculation unit which, when the network is in a congestion state, or when the network is in a non-congestion state and the most recent reception achievement rate $R_{AR}^{t-1}$ is higher than the reception rate $R_{RCV}^t$, calculates a reception achievement rate $R_{AR}^t$ as a long-term EWMA (exponential weighted moving average) of the reception rate $R_{RCV}$, and when the network is in the non-congestion state and the most recent reception achievement rate $R_p^{t-1}$ is lower than the reception rate $R_{RCV}^t$, or when a time-out of the RTCP packet occurs, calculates the reception achievement rate $R_{AR}^t$ as a short-term EWMA of the reception rate $R_{RCV}$; and a transmission rate setting unit which sets a transmission rate $R_{SND}^t$ based on the reception achievement rate $R_{AR}^t$.

As described above, the present invention can provide a transmission rate control method and a communication device, which can suppress the delivery delay and the packet loss in the streaming delivery on networks including a wireless environment.

DETAILED DESCRIPTION OF THE EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1. Configuration of Communication System]

Figure 1:
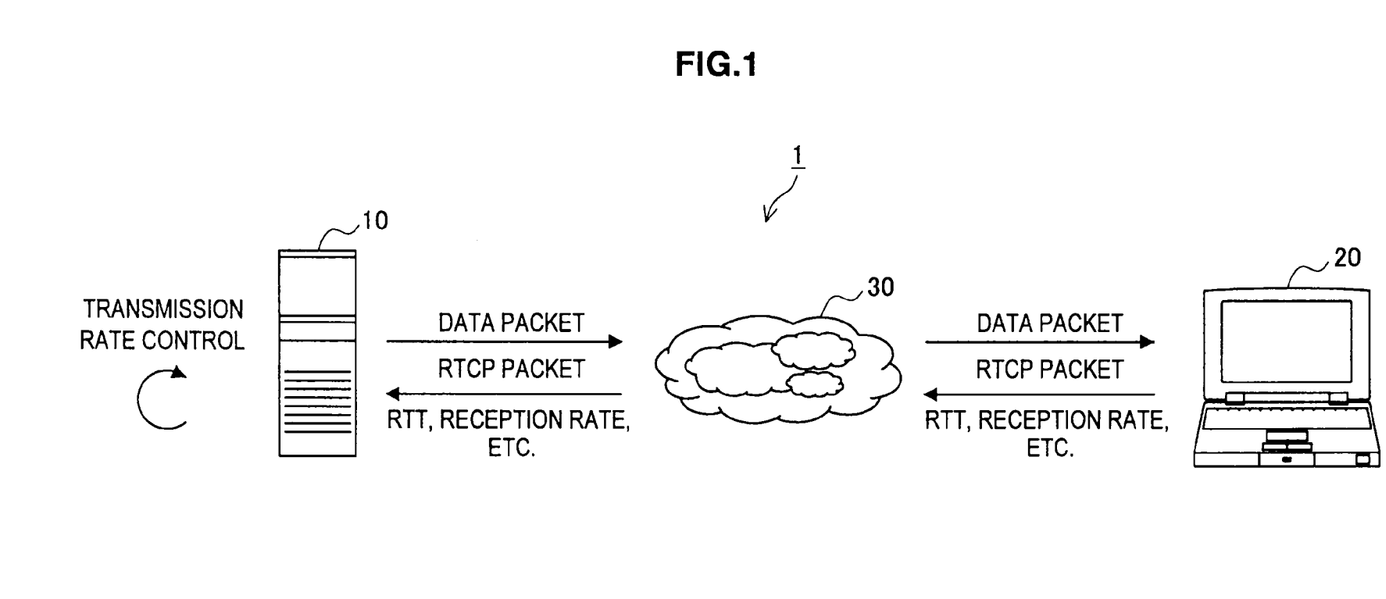
FIG. 1 is a view showing a configuration of a communication system according to an embodiment of the present invention.

FIG. 1 is a view showing a configuration of a communication system 1 according to an embodiment of the present invention. The communication system 1 includes a transmission device 10 and a reception device 20 transmitting and receiving data packets through a packet-switched network 30 including a wireless environment. The network 30 is, for example, an interne, an intranet, an extranet, and a satellite connection and includes in at least a part a wireless environment. The transmission device 10 and the reception device 20 are information processors such as a server, a personal computer, a PDA (Personal Digital Assistant), and a cell phone.

The transmission device 10 codes to packetize video data and audio data to transmit the packets to the reception device 20 at a predetermined transmission rate. The reception device 20 decodes and reproduces the data and transmits a feedback packet (RTCP packet) to the transmission device 10 with a predetermined period. The RTCP packet includes information of an RTT (Round Trip Time), a reception rate, and a packet loss rate. The transmission device 10 estimates the conditions of the network 30 from the information included in the RTCP packet to adjust a coding rate of data, and, thus, to control the transmission rate in real time.

Figure 2:
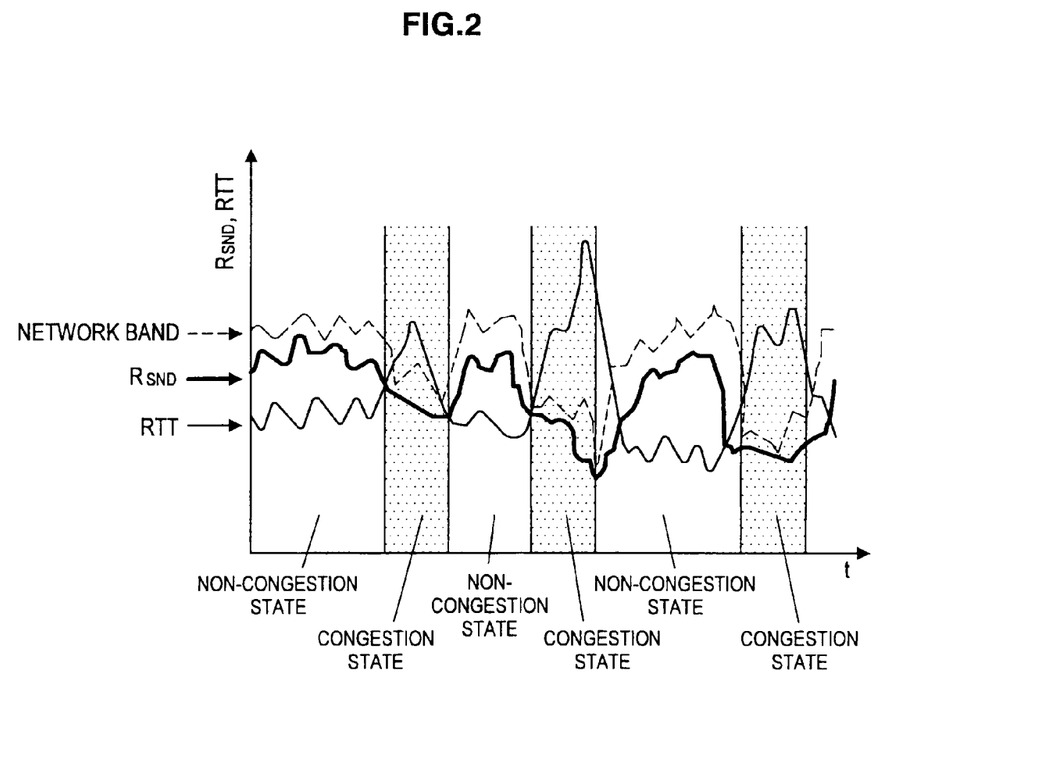
FIG. 2 is a conceptual diagram showing a transmission rate control corresponding to a congestion state of a network.

FIG. 2 is a conceptual diagram showing a transmission rate control corresponding to a congestion state of the network 30. FIG. 2 shows a network band and a time series distribution of the RTT and the transmission rate. When the RTT increases to some degree in accordance with a decrease in the network band, the network 30 transfers to the congestion state. When the RTT decreases to some degree in accordance with an increase in the network band, the network 30 transfers to a non-congestion state. The transmission rate is controlled so that when the network 30 is in the congestion state, the transmission rate increases in accordance with the decrease in the RTT, and the transmission rate decreases in accordance with the increase in the RTT. Moreover, the transmission rate is controlled so that when the network 30 is in the non-congestion state, the transmission rate is controlled for a certain period of time to be set to not more than a reception rate, and the transmission rate decreases in accordance with the increase in the RTT.

Figure 3:
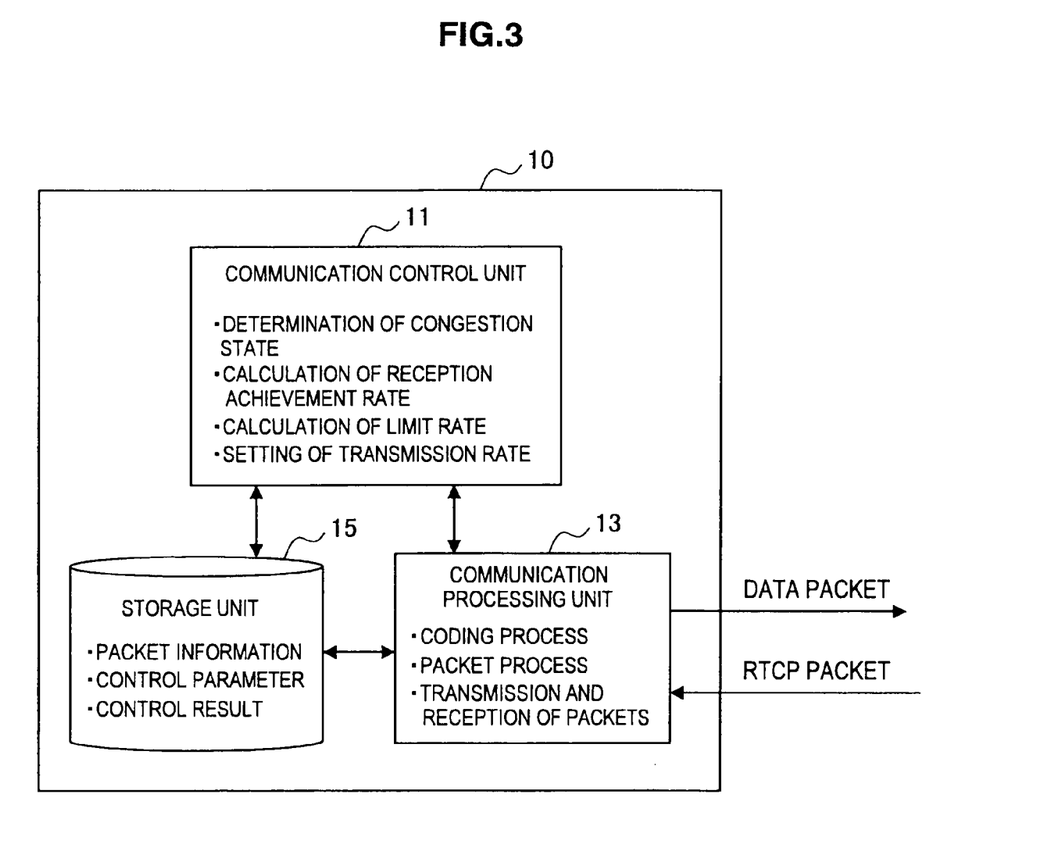
FIG. 3 is a block diagram showing a major functional configuration of a transmission device.

FIG. 3 is a block diagram showing a major functional configuration of the transmission device 10. The transmission device 10 includes a communication control unit 11, a communication processing unit 13, and a storage unit 15. The communication control unit 11 is realized by hardware and/or software for performing a transmission rate control method to be described later.

The communication control unit 11 determines the congestion state of the network 30 and sets the transmission rate based on the information included in the RTCP packet. The communication control unit 11 is operated as, for example, a congestion state determination unit, a reception achievement rate calculation unit, a limit rate calculation unit, and a transmission rate setting unit. The communication processing unit 13 codes to packetize video data and audio data and transmits the data packet to the reception device 20 through the network 30 at a predetermined transmission rate. The communication processing unit 13 further receives the RTCP packet from the reception device 20 with a predetermined period. The storage unit 15 stores the information included in the RTCP packet, parameters used for performing the control method, and results of the control method.

[2. Transmission Rate Control Method]

Figure 4:
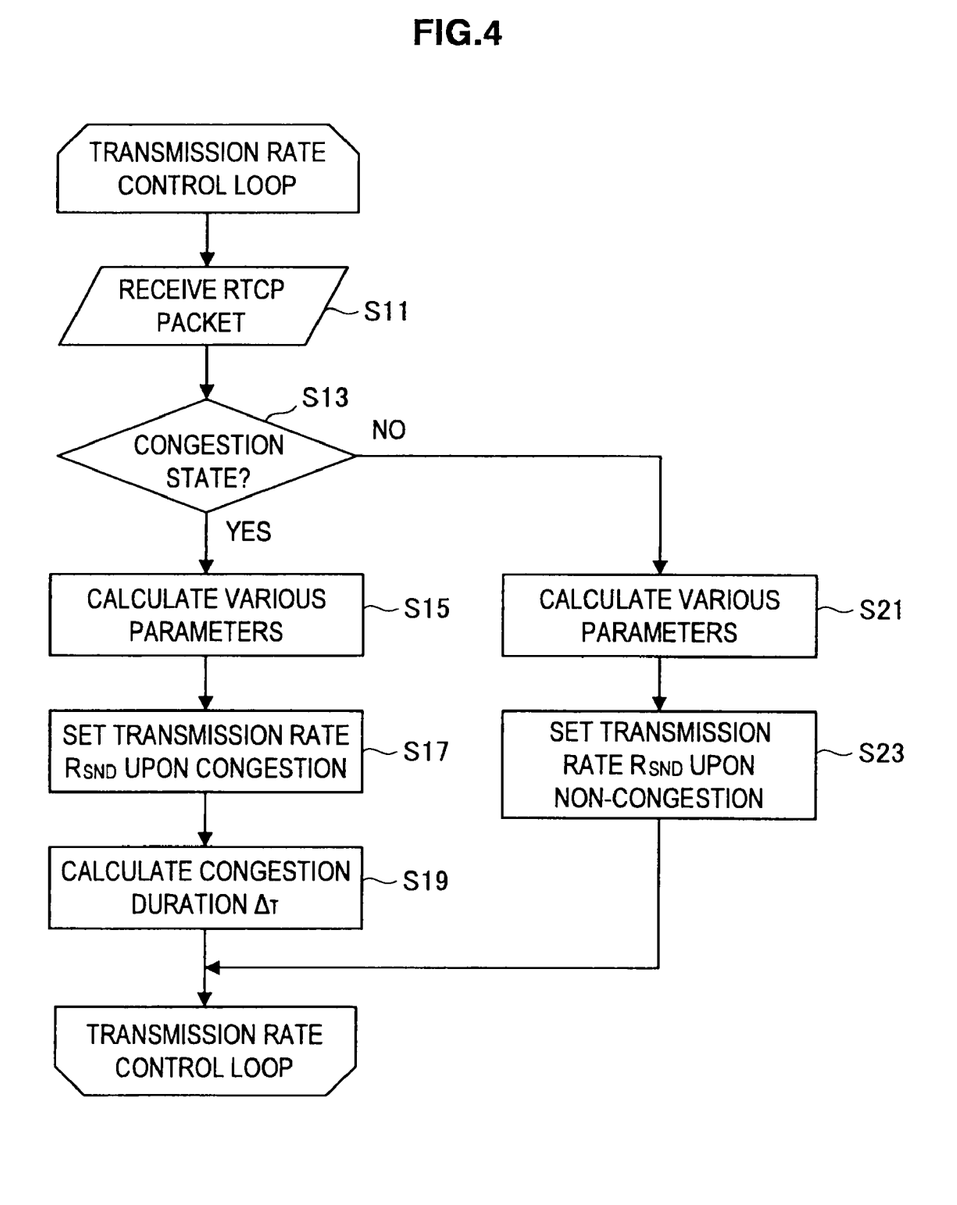
FIG. 4 is a flow diagram showing a transmission rate control method according to the embodiment of the present invention.

FIG. 4 is a flow diagram showing the transmission rate control method according to the embodiment of the present invention. The transmission device 10 receives the RTCP packet (Step S11) and determines the congestion state of the network 30 using the information included in the RTCP packet (S13). When the network 30 is in the congestion state, the transmission device 10 calculates parameters including a reception achievement rate $R_{AR}$ and a limit rate $R_{LR}$ (S15), sets a transmission rate $R_{SND}$ in the congestion state (S17), and sets a congestion state duration $\Delta_\tau$ (S19). Meanwhile, when the network 30 is in the non-congestion state, the transmission device 10 calculates parameters (S21) and sets the transmission rate $R_{SND}$ in the non-congestion state (S23). Hereinafter, the details of each processing will be described.

[2-1. Reception of RTCP Packet]

The communication processing unit 13 transmits a packet to the reception device 20 and receives the RTCP packet from the reception device 20 with a predetermined period. The RTCP packet includes information of the RTT, the reception rate, and the packet loss rate. The communication control unit 11 stores, in the storage unit 15, predetermined information of the information included in the RTCP packet. The period of the RTCP packet is suitably set corresponding to the environment for the usage of the communication system 1. The shorter the period, the better the accuracy of the rate control by the communication control unit 11; however, the network band and a processing resource are consumed.

[2-2. Determination of Congestion State]

The communication control unit 11 detects the variation of the RTT and the occurrence of the packet loss based on the information included in the RTCP packet to thereby determine the congestion state of the network 30.

In the determination of the congestion state, a Spike method, which is a kind of an LDA (Loss Discrimination Algorithm), and a Short RTT/Long RTT (SRTT/LRTT) method are utilized.

Figure 5:
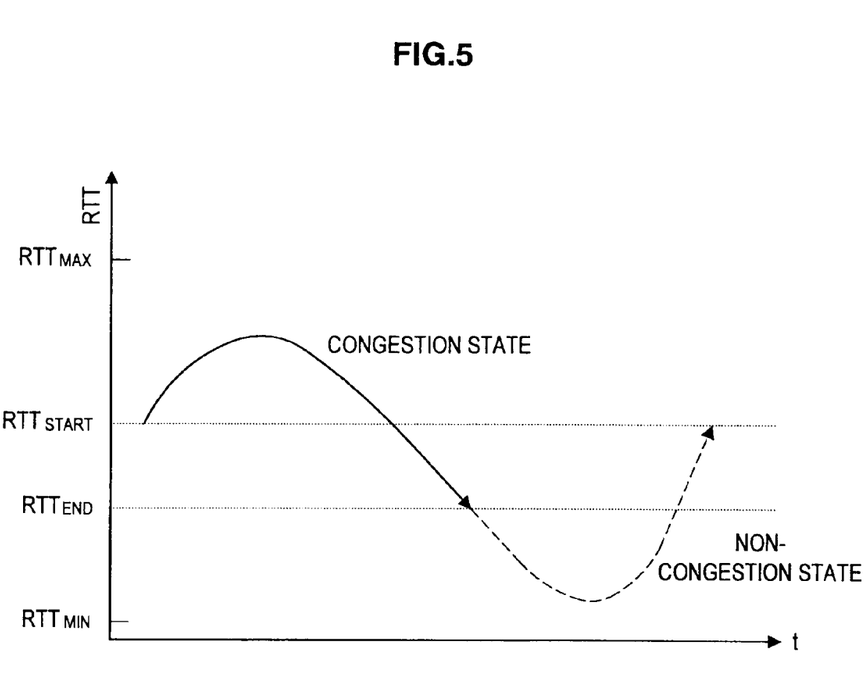
FIG. 5 is a view showing a method for determining the congestion state by a Spike method.

In the Spike method, the congestion state of the network 30 is determined based on a latest value $RTT^t$ of the RTT and a maximum value $RTT_{MAX}$ and a minimum value $RTT_{MIN}$ of the RTT in a current communication connection. As shown in FIG. 5, in the Spike method, a transfer point $RTT_{START}$ to the congestion state and a transfer point $RTT_{END}$ to the non-congestion state are defined by the following formulae (1) and (2):

$$RTT_{START} \leftarrow \alpha_{START} \cdot (RTT_{MAX} - RTT_{MIN}) + RTT_{MIN} \quad (1)$$

$$RTT_{END} \leftarrow \alpha_{END} \cdot (RTT_{MAX} - RTT_{MIN}) + RTT_{MIN} \quad (2)$$

wherein $RTT_{START}$: the transfer point to the congestion state;

$RTT_{END}$: the transfer point to the non-congestion state;
$RTT^t$: the latest value of the RTT;
$RTT_{MAX}$: the maximum value of the RTT in the current communication connection;
$RTT_{MIN}$: the minimum value of the RTT in the current communication connection; and, $\alpha_{START}$, $\alpha_{END}$: parameters
($\alpha_{END} < \alpha_{START}$, for example, $\alpha_{END} = 0.3$, $\alpha_{START} = 0.5$)

In the Spike method, once $RTT^t$ is changed from a state of not more than $RTT_{START}$ to a state of more than $RTT_{START}$, it is determined that the network 30 is transferred to the congestion state, and once $RTT^t$ is changed from a state of not less than $RTT_{END}$ to a state of less than $RTT_{END}$, it is determined that the network 30 is transferred to the non-congestion state (the congestion state is released).

In the SRTT/LRTT method, the varying condition of the RTT is determined based on SRTT that is a short-term EWMA (exponential weighted moving average) of the RTT and LRTT that is a long-term EWMA of the RTT.

In the SRTT/LRTT method, when SRTT/LRTT that is the ratio between the short-term EWMA and the long-term EWMA of the RTT is not less than $\alpha$ ($\alpha > 1$: for example, $\alpha = 1.4$), it is determined that the RTT tends to increase. When SRTT/LRTT is less than $\alpha$, it is determined that the RTT tends to decrease.

The communication control unit 11 statistically processes the RTT in the current communication connection to obtain the maximum value $RTT_{MAX}$ and the minimum value $RTT_{MIN}$ of the RTT and calculates the transfer point $RTT_{START}$ to the congestion state and the transfer point $RTT_{END}$ to the non-congestion state, using the predetermined parameters $\alpha_{START}$ and $\alpha_{END}$. The communication control unit 11 then compares $RTT^t$ included in the latest RTCP packet with $RTT_{START}$ and $RTT_{END}$ to thereby primarily determine the congestion-state of the network 30.

The communication control unit 11 statistically processes the RTT in the current communication connection to obtain $SRTT^t$ and $LRTT^t$ that are respectively the short-term EWMA and the long-term EWMA and compares $SRTT^t$ and $LRTT^t$ with a predetermined parameter $\alpha$ to thereby determine the varying condition of the RTT. The communication control unit 11 further determines the occurrence of the packet loss based on a packet loss ratio included in the latest RTCP packet.

When the latest $RTT^t$ is changed from the state of not more than $RTT_{START}$ to the state of more than $RTT_{START}$, or when the packet loss occurs, the communication control unit 11 determines that the network 30 is transferred to the congestion state. In that case, the communication control unit 11 calculates the congestion state duration $\Delta_\tau$ by the following formula (3) to store the congestion state duration $\Delta_\tau$ in the storage unit 15 along with time information showing the point of time of transferring to the congestion state:

$$\Delta_\tau \leftarrow \mu \cdot (RTT_{MAX} - RTT_{MIN})/(2 \cdot (1-\gamma)) \quad (3),$$

wherein $\Delta_\tau$: the congestion state duration;
$RTT_{MAX}$: the maximum value of the RTT in the current communication connection;
$RTT_{MIN}$: the minimum value of the RTT in the current communication connection; and
$\mu$, $\gamma$: parameters
($\mu < 1$, $0 < \gamma \leq 1$, for example, $\mu = 0.8$, $\gamma = 0.96$).

Meanwhile, when $RTT^t$ is changed from the state of not less than $RTT_{END}$ to the state of less than $RTT_{END}$, and when $SRTT^t/LRTT^t < \alpha$, the communication control unit 11 determines that the network 30 is transferred to the non-congestion state (the congestion state is released). The communication control unit 11 then compares a time T elapsed from the point of time of transferring to the congestion state with the congestion state duration $\Delta_\tau$. When $T > \Delta_\tau$, the communication control unit 11 determines that the network 30 is transferred to the non-congestion state, and when $T \leq \Delta_\tau$, the communication control unit 11 determines that the congestion state is continued.

In the VTP, with the use of the Spike method, the transfer to the congestion state is determined in accordance with a comparison result between $RTT^t$ and $RTT_{START}$, and the transfer to the non-congestion state is determined in accordance with a comparison result between $RTT^t$ and $RTT_{END}$. Meanwhile, in the present embodiment, both the current condition of the RTT and the occurrence condition of the packet loss are considered, and therefore, even when it is difficult to suitably determine the transfer to the congestion state from the current condition of the RTT, the transfer to the congestion state can be reliably determined from the occurrence condition of the packet loess. Further, both the current condition of the RTT and the varying condition of the RTT are considered, and therefore, even when it is difficult to suitably determine the transfer to the non-congestion state only from the current condition of the RTT, the transfer to the non-congestion state can be reliably determined from the varying condition of the RTT.

In the VTP, when the network 30 is transferred to the congestion state, the transmission rate is reduced by a certain amount for the congestion state duration $\Delta_\tau'$ set by the following formula (3') so that the rate reduction comparable to the TCP occurs:

$$\Delta_\tau' \leftarrow \mu \cdot RTT_{MAX}/(2 \cdot (1-\gamma)) \tag{3'}$$

In the formula 3', $\Delta_\tau'$ is calculated so as to be proportional to $RTT_{MAX}$. Thus, when $RTT_{MAX}$ is large, $\Delta_\tau'$ is calculated to be a large value even if the variation of the RTT is small, and therefore, there is an issue that the determination of the transfer to the non-congestion state is delayed. Thus, in the present embodiment, as shown in the formula (3), $\Delta_\tau$ is calculated so as to be proportional to the variation ($RTT_{MAX}-RTT_{MIN}$) of the RTT. Thus, even when $RTT_{MAX}$ is large, $\Delta_\tau$ is calculated in accordance with the variation of the RTT, and therefore, the transfer to the non-congestion state can be suitably determined.

In the transmission rate control method according to the present embodiment, when the network 30 is in the congestion state, the transmission rate $R_{SND}$ is not reduced by a certain amount unlike the VTP, but the transmission rate $R_{SND}$ is reduced to less than the reception rate $R_{RCV}$ or reduced in accordance with the increase in the RTT. Therefore, $\Delta_\tau$ may be set to smaller than $\Delta_\tau'$ of the VTP.

[2-3. Calculation of Various Parameters]

The communication control unit 11 calculates a reception achievement rate $R_{AR}^t$ and a limit rate $R_{LR}^t$ based on the information included in the RTCP packet for the purpose of setting the latest transmission rate $R_{SND}^t$.

(Reception Achievement Rate $R_{AR}$)

The latest reception achievement rate $R_{AR}^t$ is calculated as the long-term EWMA or the short-term EWMA of the reception rate $R_{RCV}$ in accordance with the network conditions. The reception achievement rate $R_{AR}^t$ is a rate at which the reception device 20 actually receives a packet and a rate that the transmission device 10 can transmit to a bottleneck.

When the network 30 is in the congestion state, or when the network 30 is in the non-congestion state and the most recent reception achievement rate $R_{AR}^{t-1}$ is higher than the reception rate $R_{RCV}^t$, the latest reception achievement rate $R_{AR}^t$ is calculated as the long-term EWMA of the reception rate $R_{RCV}$ by the formula (4). Meanwhile, when the network 30 is in the non-congestion state and the most recent reception achievement rate $R_{AR}^{t-1}$ is lower than the reception rate $R_{RCV}^t$, or when a time-out of the RTCP packet occurs, the latest reception achievement rate $R_{AR}^t$ is calculated as the short-term EWMA of the reception rate $R_{RCV}$ by the formula (5).

When the latest reception achievement rate $R_{AR}^t$ is calculated as the long-term EWMA, $$R_{AR}^t \leftarrow \alpha_L \cdot R_{AR}^{t-1} + (1-\alpha_L) \cdot R_{RCV}^t \tag{4}, \text{and}$$

when the latest reception achievement rate $R_{AR}^t$ is calculated as the short-term EWMA, $$R_{AR}^t \leftarrow \alpha_L \cdot R_{AR}^{t-1} + (1-\alpha_S) \cdot R_{RCV}^t \tag{5},$$

wherein $R_{AR}^t$: the latest reception achievement rate;
$R_{AR}^{t-1}$: the most recent reception achievement rate;
$R_{RCV}^t$: the latest reception rate; and
$\alpha_S, \alpha_L$: parameters ($0 < \alpha_S < \alpha_L < 1$).

The communication control unit 11 calculates the latest reception achievement rate $R_{AR}^t$ using the most recent reception achievement rate $R_{AR}^{t-1}$, the latest reception rate $R_{RCV}^t$, and the predetermined parameters $\alpha_S$ and $\alpha_L$ to store the latest reception achievement rate $R_{AR}^t$ in the storage unit 15.

When the network 30 is in the congestion state, the transmission rate $R_{SND}^t$ is controlled to be lower than the reception achievement rate $R_A^t$. However, immediately after the network 30 has transferred to the non-congestion state, it is preferable that the transmission rate $R_{SND}^t$ is quickly increased to the rate before transferring to the congestion state. The transmission rate $R_{SND}^t$ is increased in accordance with the increase in the reception achievement rate $R_{AR}^t$. Thus, it is preferable that in the congestion state, the reception achievement rate $R_{AR}^t$ is prevented from decreasing in accordance with the transmission rate $R_{SND}^t$ (=the reception rate $R_{RCV}^t$), and thus the latest reception achievement rate $R_{AR}^t$ is calculated as the long-term EWMA.

Meanwhile, when the network 30 is in the non-congestion state and the most recent reception achievement rate $R_{AR}^{t-1}$ is higher than the reception rate $R_{RCV}^t$, RTT is not increased, and it is determined that a temporary rate reduction free from packet loss occurs. Thus, it is preferable that the reception achievement rate $R_{AR}^t$ is prevented from being significantly varied in accordance with the temporary rate reduction, and thus the latest reception achievement rate $R_{AR}^t$ is calculated as the long-term EWMA.

Meanwhile, when the network 30 is in the non-congestion state and the most recent reception achievement rate $R_{AR}^{t-1}$ is lower than the reception rate $R_{RCV}^t$, the reception rate $R_{RCV}^t$ follows the rate-controlled transmission rate $R_{SND}^{t-1}$, and the reception rate $R_{RCV}^t$ is higher than the past reception rate $R_{RCV}$. It is preferable that the network conditions are good, and the transmission rate $R_{SND}^t$ is increased without being influenced by the past reception rate $R_{RCV}$, and thus the latest reception achievement rate $R_{AR}^t$ is calculated as the short-term EWMA.

When the time-out of the RTCP packet occurs, it is difficult to receive the RTCP packet within a certain period of time, and it is determined that the network 30 is in the extremely congested state. Thus, the transmission rate $R_{SND}^t$ is quickly reduced, and in order to suppress the reception achievement rate $R_{AR}$, the latest reception achievement rate $R_{AR}^t$ is calculated as the short-term EWMA.

In the VTP, the latest reception achievement rate $R_{AR}^t$ is uniformly calculated as EWMA of the reception rate $R_{RCV}$. Meanwhile, in the present embodiment, the latest transmission rate $R_{SND}^t$ is set based on the latest reception achievement rate $R_{AR}^t$ calculated as the long-term EWMA or the short-term EWMA of the reception rate $R_{RCV}$ in accordance with the network conditions. According to this configuration, even when the real-time streaming delivery is performed on the network 30 including a wireless environment, the followability of the transmission rate $R_{SND}{}^t$ with respect to the network conditions is enhanced, and the delivery delay and the packet loss can be suppressed.

(Limit Rate $R_{LR}{}^t$)

The limit rate $R_{LR}{}^t$ is calculated by two different ways in accordance with the magnitude relation between the most recent transmission rate $R_{SND}{}^{t-1}$ and the maximum transmission rate $R_{MAX}$ in the current communication connection. The limit rate $R_{LR}{}^t$ is calculated by the following formula (6) or (7) for the purpose of defining an upper limit value of the latest transmission rate $R_{SND}{}^t$.

When $R_{SND}{}^{t-1} < R_{MAX}$, $$R_{LR}{}^t \leftarrow R_{SND}{}^{t-1} + \alpha_{LR} \cdot (R_{MAX} - R_{SND}{}^{t-1}) + \Delta R_{MIN} \quad (6), \text{and}$$

when $R_{SND}{}^{t-1} \geq R_{MAX}$, $$R_{LR}{}^t \leftarrow R_{SND}{}^{t-1} + \Delta R_{MIN} \quad (7),$$

wherein $R_{LR}{}^t$: the limit rate, $R_{SND}{}^{t-1}$: the most recent transmission rate, $R_{MAX}$: the maximum transmission rate in the current communication connection, $\Delta R_{MIN}$: the minimum increase limit rate (a constant, $\Delta R_{MIN} \geq 0$), and $\alpha_{LR}$: a parameter ($0 < \alpha_{LR} < 1$)

The communication control unit 11 statistically processes the transmission rate $R_{SND}$ in the current communication connection to obtain the maximum transmission rate $R_{MAX}$ and calculates the limit rate $R_{LR}{}^t$ using the predetermined parameter $\Delta R_{MIN}$ to store the limit rate $R_{LR}{}^t$ in the storage unit 15. The parameter $\Delta R_{MIN}$ means an increase in an allowable rate.

Figure 6:
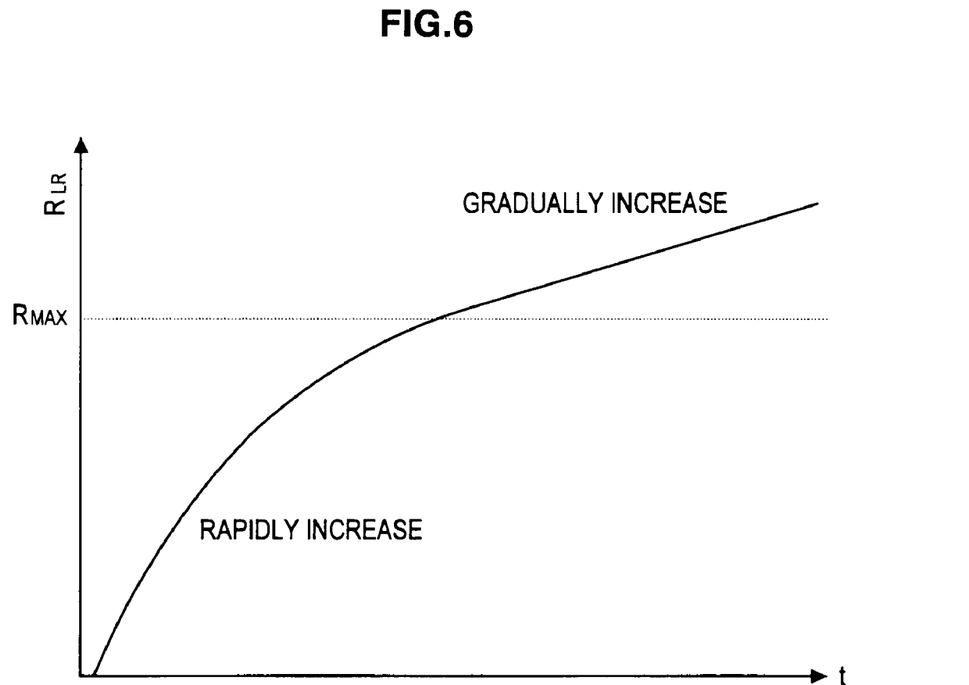
FIG. 6 is a view showing a method for setting a limit rate.

As shown in FIG. 6, the latest transmission rate $R_{SND}{}^t$ is defined by the limit rate $R_{LR}{}^t$, whereby when the most recent transmission rate $R_{SND}{}^{t-1}$ is low, the latest transmission rate $R_{SND}{}^t$ is quickly increased to the maximum transmission rate $R_{MAX}$, and when the most recent transmission rate $R_{SND}{}^{t-1}$ is high, the latest transmission rate $R_{SND}{}^t$ can be slowly increased.

[2-4. Setting of Transmission Rate]

The communication control unit 11 sets the latest transmission rate $R_{SND}{}^t$ in accordance with the congestion state of the network 30, using the previously calculated reception achievement rate $R_{AR}{}^t$ and the limit rate $R_{LR}{}^t$. The latest transmission rate $R_{SND}{}^t$ is represented by the following formulae:

when the network 30 is in the non-congestion state, $$R_{SND}{}^t \leftarrow (R_{RCV}{}^t \cdot RTT^t + 1)/(RTT^t + \Delta RTT) \quad (8)$$

$$R_{SND}{}^t \leftarrow \beta \cdot R_{SND}{}^t + (1-\beta) \cdot R_{AR}{}^t \quad (9), \text{and}$$

further, when $R_{SND}{}^t > R_{LR}{}^t$, $$R_{SND}{}^t \leftarrow R_{LR}{}^t \quad (10); \text{and}$$

when the network 30 is in the congestion state, $$R_{SND}{}^t \leftarrow \gamma \cdot R_{AR}{}^t \quad (11),$$

further, when $R_{SND}{}^t > R_{RCV}{}^t$, $$R_{SND}{}^t \leftarrow R_{RCV}{}^t \quad (12)$$

$$R_{SND}{}^n \leftarrow (R_{RCV}{}^t \cdot RTT^t + 1)/(RTT^t + \Delta RTT) \quad (13), \text{and}$$

further, when $R_{SND}{}^n < R_{SND}{}^t$, $$R_{SND}{}^t \leftarrow (R_{SND}{}^n + R_{SND}{}^t)/2 \quad (14)$$

wherein $R_{SND}{}^t$: the latest transmission rate, $R_{RCV}{}^t$: the latest reception rate, $RTT^t$: the latest RTT, $RTT^{t-1}$: the most recent RTT, $\Delta RTT$: the variation of the RTT ($= RTT^t - RTT^{t-1}$)

$R_{AR}{}^t$: the latest reception achievement rate, $R_{LR}{}^t$: the limit rate, $R_{SND}{}^n$: a temporary transmission rate, and $\beta, \gamma$: parameters ($0 < \beta < 1$, $0 < \gamma \leq 1$, for example, $\beta = 0.7$).

The communication control unit 11 statistically processes the RTT to obtain $\Delta RTT$ and sets the latest transmission rate $R_{SND}{}^t$ using the predetermined parameters $\beta$ and $\gamma$ to store the latest transmission rate $R_{SND}{}^t$ in the storage unit 15.

When the network 30 is in the non-congestion state, the communication control unit 11 sets the latest transmission rate $R_{SND}{}^t$ by the formula (8). By virtue of the formula (8), the transmission rate $R_{SND}{}^t$ decreases when the RTT tends to increase, and the transmission rate $R_{SND}{}^t$ increases when the RTT tends to decrease. The communication control unit 11 sets again the transmission rate $R_{SND}{}^t$ by the formula (9), and when the reset transmission rate $R_{SND}{}^t$ is more than the limit rate $R_{LR}{}^t$, the latest transmission rate $R_{SND}{}^t$ is defined to the upper limit value (the limit rate $R_{LR}{}^t$) by the formula (10).

Meanwhile, when the network 30 is in the congestion state, by virtue of the formula (II), the communication control unit 11 sets the latest transmission rate $R_{SND}{}^t$ to the rate reduced by a certain amount from the reception achievement rate $R_{AR}$ before transferring to the congestion state. When the transmission rate $R_{SND}{}^t$ set by the communication control unit 11 is more than the latest reception rate $R_{RCV}{}^t$, the communication control unit 11 sets the latest transmission rate $R_{SND}{}^t$ to the latest reception rate $R_{RCV}{}^t$ by the formula (12). Further, the communication control unit 11 calculates the temporary transmission rate $R_{SND}{}^n$ by the formula (13). When the temporary transmission rate $R_{SND}{}^n$ is more than the transmission rate $R_{SND}{}^t$ set by the formula (11) or (12), the communication control unit 11 sets again the latest transmission rate $R_{SND}{}^t$ by the formula (14).

In the formulae (8) and (12), the latest transmission rate $R_{SND}{}^t$ is set using the latest reception rate $R_{RCV}{}^t$. Meanwhile, in the VTP, the latest transmission rate $R_{SND}{}^t$ is set using the most recent transmission rate $R_{SND}{}^{t-1}$ instead of the latest reception rate $R_{RCV}{}^t$. Thus, in the present embodiment, the transmission rate $R_{SND}{}^t$ quickly follows the decrease in the reception rate $R_{RCV}{}^t$, whereby the occurrence of the packet loss and the increase in the RTT can be avoided.

When it is difficult for the communication processing unit 13 to receive the RTCP packet from the reception device 20 within a predetermined period (for example, four periods), the communication control unit 11 exponentially reduces the transmission rate $R_{SND}{}^t$.

[3. Summary]

As described above, according to the transmission rate control method of the present embodiment, the latest transmission rate $R_{SND}$ is set based on the latest reception achievement rate $R_{AR}$ calculated as the long-term EWMA or the short-term EWMA of the reception rate $R_{RCV}$ in accordance with the network conditions. According to this configuration, in the streaming delivery on the network 30 including a wireless communication, the followability of the transmission rate $R_{SND}$ with respect to the network conditions is enhanced, and the delivery delay and the packet loss can be suppressed.

Further, according to the transmission rate control method of the present embodiment, lower-level information than a transport layer is not used, and feedback is performed from the reception device 20 to the transmission device 10 by end-to-end, whereby the transmission rate control hardly depending on hardware can be realized.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission rate control method comprising the steps of:
    in a streaming delivery on a network which includes a wireless environment, transmitting data to a reception device at a most recent transmission rate $R_{SND}^{t-1}$ and receiving an RTCP packet including a reception rate $R_{RCV}^{t}$ of data from the reception device;
    when the network is in a congestion state, or when the network is in a non-congestion state and a most recent reception achievement rate $R_{AR}^{t-1}$ is higher than the reception rate $R_{RCV}^{t}$, calculating a reception achievement rate $R_{AR}^{t}$ as a long-term EWMA (exponential weighted moving average) of the reception rate, and
    when the network is in the non-congestion state and the most recent reception achievement rate $R_{AR}^{t-1}$ is lower than the reception rate $R_{RCV}^{t}$, or when a time-out of the RTCP packet occurs, calculating the reception achievement rate $R_{AR}^{t}$ as a short-term EWMA of the reception rate; and
    setting a transmission rate $R_{SND}^{t}$ based on the reception achievement rate $R_{AR}^{t}$.

2. The transmission rate control method according to claim 1, wherein in the step of calculating the reception achievement rate $R_{AR}^{t}$, the reception achievement rate $R_{AR}^{t}$ is calculated as the long-term EWMA or the short-term EWMA of the reception rate represented by the following formula:
    when the reception achievement rate $R_{AR}^{t}$ is calculated as the long-term EWMA of the reception rate, $$R_{AR}^{t} \leftarrow \alpha_L \cdot R_{AR}^{t-1} + (1-\alpha_L) \cdot R_{RCV}^{t}, \text{ and}$$

when the reception achievement rate $R_{AR}^{t}$ is calculated as the short-term EWMA of the reception rate, $$R_{AR}^{t} \leftarrow \alpha_S \cdot R_{AR}^{t-1} + (1-\alpha_S) \cdot R_{RCV}^{t},$$

wherein $0 < \alpha_S < \alpha_L < 1$.

3. The transmission rate control method according to claim 1, wherein in the step of setting the transmission rate $R_{SND}^{t}$, the transmission rate $R_{SND}^{t}$ is set, when the network is in the non-congestion state, by the following formulae:

$$R_{SND}^{t} \leftarrow (R_{RCV}^{t} \cdot RTT^{t} + 1)/(RTT^{t} + \Delta RTT)$$

$$R_{SND}^{t} \leftarrow \beta \cdot R_{SND}^{t} + (1-\beta) \cdot R_{AR}^{t}, \text{ and}$$

further, when $R_{SND}^{t} > $ a limit rate $R_{LR}^{t}$, $R_{SND}^{t} \leftarrow R_{LR}^{t}$; or
    the transmission rate $R_{SND}^{t}$ is set, when the network is in the congestion state, by the following formulae:

$$R_{SND}^{t} \leftarrow \gamma \cdot R_{AR}^{t},$$

further, when $R_{SND}^{t} > R_{RCV}^{t}$, $R_{SND}^{t} 77 R_{RCV}^{t}$, $$R_{SND}^{t'} \leftarrow (R_{RCV}^{t} \cdot RTT^{t} + 1)/(RTT^{t} + \Delta RTT), \text{ and}$$

further, when $R_{SND}^{t'} < R_{SND}^{t}$, $R_{SND}^{t} \leftarrow R_{SND}^{t} + R_{SND}^{t'})/2$,
wherein $RTT^{t}$ and $RTT^{t-1}$ are the latest RTT and the most recent RTT, $\Delta RTT$ is a variation of the RTT ($RTT^{t} - RTT^{t-1}$), $R_{LR}$ is the limit rate defining an upper limit of $R_{SND}^{t}$, $R_{SND}^{t'}$ is a temporary transmission rate, $0 < \beta < 1$, and $0 < \gamma < 1$.

4. The transmission rate control method according to claim 3, wherein the limit rate $R_{LR}^{t}$ is calculated by the following formula:
    when $R_{SND}^{t-1} < R_{MAX}$, $$R_{LR}^{t} \leftarrow R_{SND}^{t-1} + \alpha_{LR} \cdot (R_{MAX} - R_{SND}^{t-1}) + \Delta R_{MIN}, \text{ and}$$

when $R_{SND}^{t-1} \geq R_{MAX}$, $$R_{LR}^{t} \leftarrow R_{SND}^{t-1} + \Delta R_{MIN},$$

wherein $R_{SND}^{t-1}$ is the most recent transmission rate, $R_{MAX}$ is the maximum transmission rate in the current communication connection, $\Delta R_{MIN}$ is the minimum increase limit rate (a constant, $\Delta R_{MIN} \geq 0$), and $0 < \alpha_{LR} < 1$.

5. The transmission rate control method according to claim 1, wherein when $RTT^{t}$ is changed from a state of not more than $RTT_{START}$ to a state of more than $RTT_{START}$, or when a packet loss occurs, a transmission rate control unit determines that the network is transferred to the congestion state, and
    when $RTT^{t}$ is changed from a state of not less than $RTT_{END}$ to a state of less than $RTT_{END}$, and when $SRTT^{t}/LRTT^{t} < \alpha$, the transmission rate control unit determines that the network is transferred to the non-congestion state, and
    further comprising a step of, even when the transmission rate control unit determines that the network is transferred to the non-congestion state, the congestion state of the network is continued for a congestion state duration $\Delta_\tau$, represented by the following formula, from the point of time when the network transfers to the congestion state:

$$\Delta_\tau \leftarrow \mu \cdot (RTT_{MAX} - RTT_{MIN})/(2 \cdot (1-\gamma)),$$

wherein $RTT^{t}$ is the latest RTT, $RTT_{START}$ and $RTT_{END}$ are RTT upon the transfer of the network to the congestion state defined by a Spike method and RTT upon the transfer of the network to the non-congestion state defined by the Spike method, $SRTT^{t}$ and $LRTT^{t}$ are the short-term EWMA and the long-term EWMA of the RTT, $\alpha > 1$, $0 < \gamma < 1$, and $\mu < 1$.

6. A communication device comprising:
    a communication processing unit which, in a streaming delivery on a network which includes a wireless environment, transmits data to a reception device at a most recent transmission rate $R_{SND}^{t-1}$ and receives an RTCP packet including a reception rate $R_{RCV}^{t}$ of data from the reception device;
    a reception achievement rate calculation unit which, when the network is in a congestion state, or when the network is in a non-congestion state and a most recent reception achievement rate $R_{AR}^{t-1}$ is higher than the reception rate $R_{RCV}^{t}$, calculates a reception achievement rate $R_{AR}^{t}$ as a long-term EWMA (exponential weighted moving average) of the reception rate, and when the network is in the non-congestion state and the most recent reception achievement rate $R_{AR}^{t-1}$ is lower than the reception rate $R_{RCV}^{t}$, or when a time-out of the RTCP packet occurs, calculates the reception achievement rate $R_{AR}^{t}$ as a short-term EWMA of the reception rate; and
    a transmission rate setting unit which sets a transmission rate $R_{SND}^{t}$ based on the reception achievement rate $R_{AR}^{t}$.

* * * * *